2 Sheets—Sheet 1.

W. A. JAMES.

Sulky Plow.

No. 9,501. Reissued Dec. 21, 1880.

Attest.
Charles Pickles
Walter Allen

Inventor.
Wm. Austin James
By Knights Bros
Attys

N. PETERS, PHOTO-LITHOGRAPHER, WASHINGTON, D. C.

W. A. JAMES.
Sulky Plow.

No. 9,501. Reissued Dec. 21, 1880.

*Attest.*
Charles Pickles
Walter Allen

*Inventor.*
Wm. Austin James
By Knight Bros
Attys

N. PETERS, PHOTO-LITHOGRAPHER, WASHINGTON, D. C.

UNITED STATES PATENT OFFICE.

WILLIAM A. JAMES, OF ST. LOUIS, MISSOURI.

SULKY-PLOW.

SPECIFICATION forming part of Reissued Letters Patent No. 9,501, dated December 21, 1880.

Original No. 224,188, dated February 3, 1880. Application for reissue filed November 1, 1880.

*To all whom it may concern:*

Be it known that I, WILLIAM AUSTIN JAMES, of the city of St. Louis, in the State of Missouri, have invented a new and useful Improvement in Sulky-Plows, of which the following is a full, clear, and exact description, reference being had to the accompanying drawings, making part of this specification.

Figure 1:
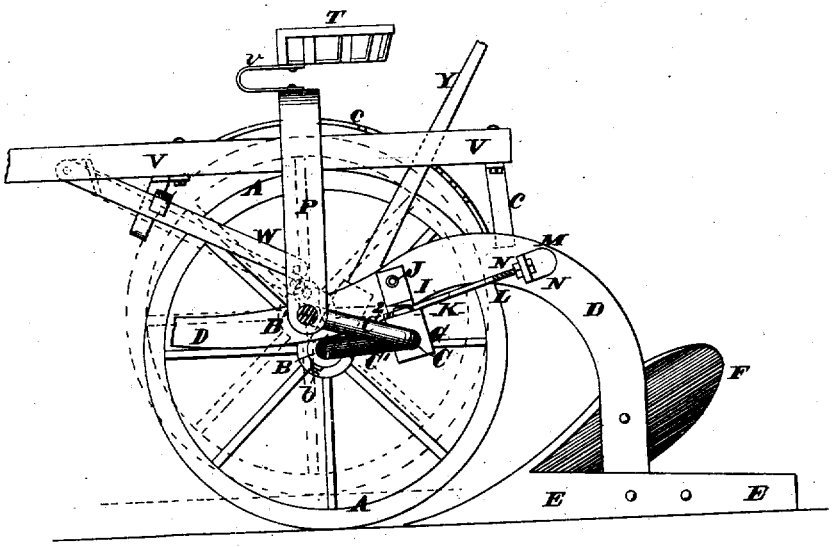
Figure 2:
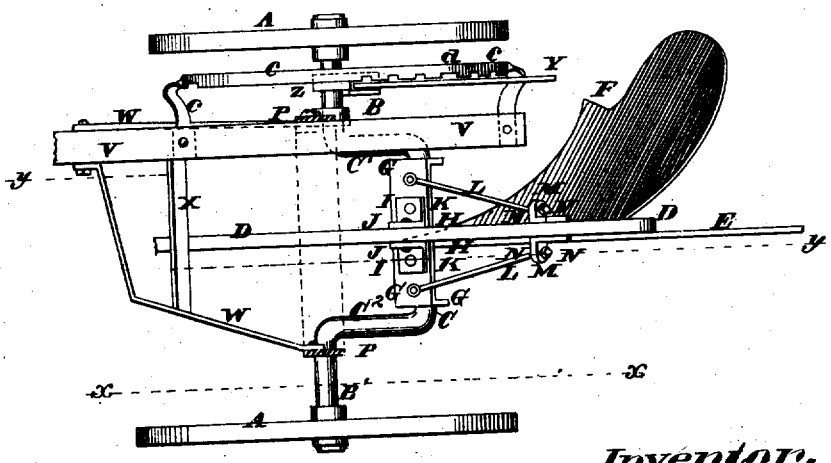
Figure 3:
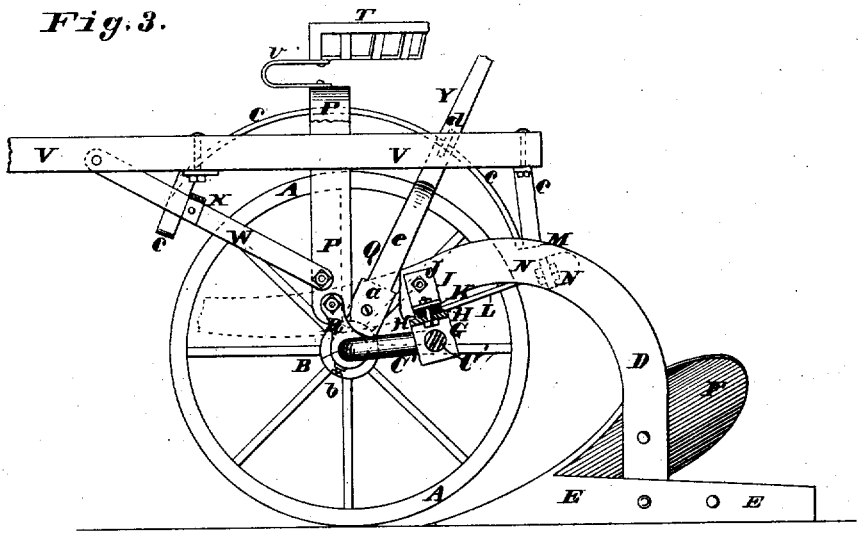
Figure 5:
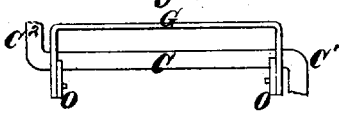
Figure 6:
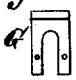
Figure 7:
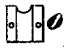
Figure 4:
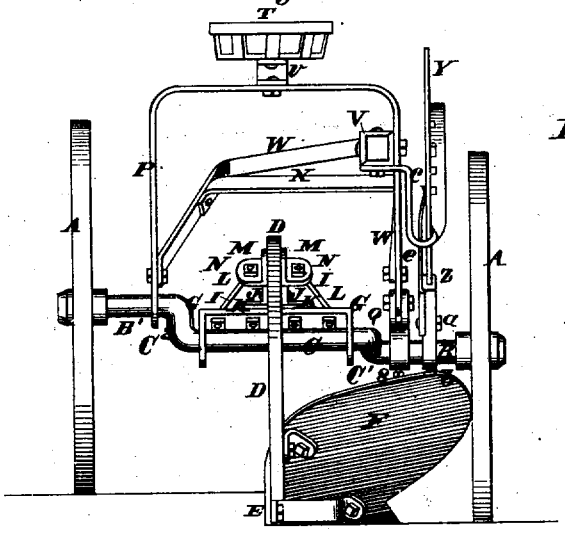
Figure 8:
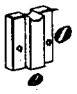

Figure 1 is a sectional side elevation of my improvement, taken through the line *x x*, Fig. 2. Fig. 2 is a sectional plan view. Fig. 3 is a sectional side elevation taken through the line *y y*, Fig. 2. Fig. 4 is a rear elevation. Figs. 5, 6, 7, and 8 represent a modification.

The object of the invention is to produce a ready and convenient adjustment of the plow, and to allow its ready vertical movement without causing an inclination of the seat, &c.

The wheels are shown at A. The axle consists of two end portions, B B′, connected by a crank, C, twisted so that when the right arm, C′, of the crank is horizontal the left arm, $C^2$, may incline upward, as shown in Fig. 1. The left arm of the crank, which is in connection with the part B′ of the axle carrying the land-wheel, should be a little longer than the right arm, that carries the part B and the furrow-wheel, so that the two wheels will be opposite to each other, or nearly so.

D is the beam, E is the land-side, and F is the mold-board, of an ordinary plow.

The plow-beam rests upon the bar G, at or near the middle of said bar. The ends of the bar G are bent downward and have bearing upon the crank C of the axle. The plow-beam rests between two low stops, H, upon the bar G, and is secured in place by two angle-irons, I, the upper arms of which extend up the opposite sides of the beam D, and are secured thereto by a bolt, J, passing through them and through the beam. The lower arms of the angle-irons are secured to the bar G by bolts K. With this construction, by loosening the three bolts J K K the beam may be turned so as to move the plow sidewise bodily to the right or left, as may be required, without changing the location of the beam upon the bar G, and by tightening the said bolts the plow may be held securely to its adjustment. The holes through which the bolts K K pass in the angle-irons or in the bar may be made a little larger than the bolts to allow the adjustment of the beam.

The plow is further strengthened in its position by two inclined bars, L, the forward ends of which are bolted to the bar G. The rear ends of the bars L have screw-threads formed upon them, and pass through lugs M, attached to the opposite sides of the beam D, and have nuts N N screwing on each bar upon opposite sides of the lugs M. With this construction the plow can be adjusted with its point toward the land by loosening the three bolts J K K, the forward nut, N, upon the right brace L and the rear nut upon the left brace L, and then tightening up the nuts to suit the new position. When the plow is to be adjusted with its point from the land the three bolts J K K are loosened and the forward nut upon the left brace and the rear nut upon the right brace turned back from the lugs sufficiently to permit the adjustment, and the parts are again made fast.

The bar G turns freely upon the crank C. It (G) may be made detachable by slotting out its ends to receive the axle-crank C. In this case the bar G is secured upon the axle-crank by the blocks O, which have projections *o* formed upon one side to fit into the slots of the bar G, and notches in their upper ends to receive the axle-crank C, and are bolted to the slotted ends of the bar G, as indicated in Figs. 5, 6, 7, and 8.

P is a bent or arched bar, the left arm of which has a hole formed through its end to receive the arm or end B′ of the axle. The right arm of the arched bar P has a hole formed through its end to receive the bolt Q, by which it is hinged to the outer end of the arm R. The inner end of the arm R has a hole formed through it to receive the axle-arm B, to which it is shown secured by a set-screw, S. With this construction the side arms of the arched bar P will be held vertical, however the axle may be adjusted, as the bolt Q is in line with, or nearly in line with, the left arm, B′, of the axle.

T is the driver's seat, which is connected with the top of the arched bar P by a spring-standard, U, or other suitable means.

V is the tongue, or a bar to which the tongue is attached. The tongue or bar V is bolted to the upper part of the right arm of the arched bar P, and is strengthened in position by the braces W, the forward ends of which are bolted to the opposite sides of the tongue or bar V. The rear ends of the braces W are bolted to the arms of the arched bar P near their ends. The braces W are strengthened by a cross-box, X, bolted to them.

Y is a lever, the lower end of which is inserted in a socket, Z, where it is secured in place by a screw or bolt, *a*. The lower part of the socket Z has a transverse hole formed through it to receive the arm B of the axle, to which it is shown secured by a set-screw, *b*, so that the axle may be turned to adjust the plow and level the machine by operating the lever Y. The lever Y moves along a notched bar, *c*, and is provided with a flange or catch, *d*, to engage with the notches of said bar *c* and hold said lever Y in any position in which it may be placed. The notched bar *c* is arched and its ends curved inward and upward, and are secured to the bar or tongue V. The lever Y is held against the notched bar *c* by a spring, *e*, which rests against the inner side of the lever Y and has its lower end secured to the socket Z. With this construction, by operating the lever Y the plow may be adjusted to run at any desired depth in the ground, or raised up above the ground, the sulky being all the time level.

I claim as my invention—

1. In a sulky-plow, the combination, with the crank C of the axle-arms B B′ and the beam D of a plow, of the bent bar G, provided with stops H, the angle-irons I, adjusting-bolts, and the adjusting-braces L, substantially as herein shown and described, so that the plow may have the adjustments as set forth.

2. The combination of axle B B′ C, arched seat-support P, and arm R, attached to the part B of the axle and hinged to the support P, substantially as and for the purpose set forth.

3. The combination, in a sulky-plow, of lever Y, notched segment *c*, crank-axle B B′ C, arched seat-support P, and arm R, constructed and relatively arranged substantially as set forth.

4. The combination of axle-crank C, bridge-bar G, and angle-irons I, adjusting bolts and nuts J K N, bars L, and plow-beam with eye-lugs M, for the purpose set forth.

5. The combination of bridge-bar G, with slotted ends to embrace the axle, and blocks O, constructed to fit the slotted ends and bear against the under side of the axle, for the purpose set forth.

6. The combination of axle-crank C, bridge-bar G, stops H, and angle-irons I, substantially as and for the purpose set forth.

WM. AUSTIN JAMES.

Witnesses:
SAML. KNIGHT,
A. D. STANDISH.